United States Patent
Gschwind et al.

(10) Patent No.: US 9,569,127 B2
(45) Date of Patent: Feb. 14, 2017

(54) COMPUTER INSTRUCTIONS FOR LIMITING ACCESS VIOLATION REPORTING WHEN ACCESSING STRINGS AND SIMILAR DATA STRUCTURES

(71) Applicant: International Business Machines Corporation, Armonk, NY (US)

(72) Inventors: Michael Gschwind, Chappaqua, NY (US); Brett Olsson, Cary, NC (US); Raul E. Silvera, Dublin, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 14/583,970

(22) Filed: Dec. 29, 2014

(65) Prior Publication Data

US 2016/0188242 A1    Jun. 30, 2016

(51) Int. Cl.
*G06F 3/06* (2006.01)
*G06F 9/38* (2006.01)
(Continued)

(52) U.S. Cl.
CPC .......... *G06F 3/0622* (2013.01); *G06F 3/0659* (2013.01); *G06F 3/0673* (2013.01); *G06F 9/3887* (2013.01);
(Continued)

(58) Field of Classification Search
CPC ................................ G06F 3/06; G06F 3/0622
See application file for complete search history.

(56) References Cited

U.S. PATENT DOCUMENTS 4,959,776 A    9/1990 Deerfield
5,043,867 A    8/1991 Bhandarkar et al.
(Continued)

FOREIGN PATENT DOCUMENTS

JP    63197254 A    8/1988
JP    2004327982 A    11/2004

OTHER PUBLICATIONS

Appendix P, List of IBM Patents or Patent Applications Treated as Related dated Aug. 25, 2015.
(Continued)

*Primary Examiner* — David X Yi
*Assistant Examiner* — Zubair Ahmed
(74) *Attorney, Agent, or Firm* — Cantor Colburn LLP; Steven Chiu

(57) ABSTRACT

Embodiments are directed to a method of accessing a data frame. The method includes, based at least in part on a determination that the data frame spans first and second memory blocks, and further based at least in part on a determination that the processor has access to the first and second memory blocks, accessing the data frame. The method includes, based at least in part on a determination that the data frame spans the first and second memory blocks, and based at least in part on a determination that the processor has access to the first memory block but does not have access to the second memory block, accessing a first portion of the data frame that is in the first memory block, and accessing at least one default character as a replacement for accessing a second portion of the data frame that is in the second memory block.

15 Claims, 10 Drawing Sheets

(51) Int. Cl.
*G06F 12/12* (2016.01)
*G06F 12/14* (2006.01)
*G06F 13/24* (2006.01)

(52) U.S. Cl.
CPC ......... *G06F 12/121* (2013.01); *G06F 12/1425* (2013.01); *G06F 13/24* (2013.01); *G06F 2212/1052* (2013.01); *G06F 2212/69* (2013.01)

(56) References Cited

U.S. PATENT DOCUMENTS

| | | | |
|---|---|---|---|
| 5,063,497 A | | 11/1991 | Cutler et al. |
| 5,222,225 A | | 6/1993 | Groves |
| 6,205,533 B1 | * | 3/2001 | Margolus ............ G06F 15/8023 712/13 |
| 6,952,756 B1 | | 10/2005 | Le |
| 7,119,266 B1 | * | 10/2006 | Bittner ................. G09B 15/023 84/477 R |
| 7,149,862 B2 | | 12/2006 | Tune et al. |
| 7,409,512 B1 | | 8/2008 | Kekre et al. |
| 7,523,290 B2 | | 4/2009 | Franaszek et al. |
| 7,610,469 B2 | | 10/2009 | Ansari |
| 8,146,155 B1 | | 3/2012 | Todd et al. |
| 8,296,538 B2 | | 10/2012 | Grisenthwaite |
| 8,572,345 B2 | | 10/2013 | Moyer |
| 8,862,932 B2 | | 10/2014 | Gonion |
| 2009/0049220 A1 | * | 2/2009 | Conti ...................... G06F 13/24 710/267 |
| 2011/0264855 A1 | * | 10/2011 | Kasako ................. G06F 3/0607 711/114 |
| 2012/0124423 A1 | * | 5/2012 | Chakravadhanula G01R 31/31727 714/27 |
| 2013/0111194 A1 | | 5/2013 | Grochowski et al. |
| 2013/0191615 A1 | | 7/2013 | Orenstien |
| 2013/0246738 A1 | | 9/2013 | Bradbury et al. |
| 2013/0246739 A1 | | 9/2013 | Bradbury |
| 2013/0246740 A1 | | 9/2013 | Bradbury et al. |
| 2013/0246751 A1 | | 9/2013 | Bradbury et al. |
| 2013/0246752 A1 | | 9/2013 | Bradbury et al. |
| 2013/0246757 A1 | | 9/2013 | Bradbury et al. |
| 2013/0246759 A1 | | 9/2013 | Bradbury et al. |
| 2013/0246762 A1 | | 9/2013 | Bradbury et al. |
| 2013/0246763 A1 | | 9/2013 | Bradbury et al. |
| 2013/0246764 A1 | | 9/2013 | Bradbury et al. |
| 2013/0246767 A1 | | 9/2013 | Bradbury et al. |
| 2014/0208086 A1 | | 7/2014 | Bradbury et al. |
| 2014/0237199 A1 | | 8/2014 | Murray et al. |
| 2015/0142819 A1 | * | 5/2015 | Florendo ........... G06F 17/30312 707/741 |

OTHER PUBLICATIONS

Michael Gschwind, "Computer Instructions for Limiting Access Violation Reporting When Accessing Strings and Similar Data Structures." U.S. Appl. No. 13/421,451, filed Aug. 11, 2015.
Appendix P, List of IBM Patents or Patent Applications Treated as Related dated Sep. 8, 2015.
Michael Gschwind, "Processing Page Fault Exceptions in Supervisory Software When Accessing Strings and Similar Data Structures Using Normal Load Instructions ." U.S. Appl. No. 14/829,896, filed Aug. 19, 2015.
Appendix P, List of IBM Patents or Patent Applications Treated as Related dated Dec. 30, 2014.
B.L. Sharp et al. "Extending hardware based mandatory access controls for memory to multicore architectures." Proceedings of the 4th annual workshop on Cyber security and information intelligence research; ACM 2008; 3 pages.
U.S. Appl. No. 14/562,132, filed Dec. 5, 2014, Entitled: Vector Exception Code, First Named Inventor: Jonathan D. Bradbury.
U.S. Appl. No. 14/583,974, filed Dec. 29, 2014, Entitled: Processing Page Fault Exceptions in Supervisory Software When Accessing Strings and Similar Data Structures Using Normal Load Instructions, First Inventor: Michael Gschwind.
Appendix P, List of IBM Patents or Patent Applications Treated as Related dated Jun. 1, 2016. (2 Pages).
International Search Report and Written Opinion for International Application No. PCT/IB2015/059874; International Filing Date Dec. 22, 2015; Report Mail Date Mar. 22, 2016 (11 Pages).
Michael Gschwind, "Computer Instructions for Limiting Access Violation Reporting When Accessing Strings and Similar Data Structures" U.S. Appl. No. 14/821,940, filed Aug. 10, 2015.

* cited by examiner

OVERHEAD OF USING SIMD STORAGE ACCESSES ON STRLEN()

```
strlen:         li          rSRC_INDEX,0            } 102
                andi        rTMP,rSRC_PTR,0x0FFF    ⎫
                cmpli       cr0,rTMP,0x0FF0         ⎬ 104
                bgt         cr0,TakeCare            ⎭ do_loop:        lxvx        vSRC,rSRC_PTR,rSRC_INDEX    ⎫
                vcmpnezb.   vMASK,VSRC,VSRC             ⎪
                bf          cr6.ALL_FALSE,EOS_FOUND     ⎬ 102
                addi        rSRC_INDEX,rSRC_INDEX,16    ⎭
                addi        rTMP,rTMP,16            ⎫ 104
                cmpli       cr0,rTMP,0x0FF0         ⎭
                bgt         cr0,do_loop             } 102

EOS_found:      vclzlsbb    vEOS_INDEX,vMASK            ⎫
                mfvsrd      rEOS_INDEX,vEOS_INDEX       ⎬ 102
                add         rRESULT,rSRC_INDEX,rEOS_INDEX⎭
                blr TakeCare:       subfi       rDIST,rTMP,0x1000           ⎫
                add         rSRC_PTR,rSRC_PTR,rSRC_INDEX ⎪
                lxvl        vSRC,rSRC_PTR,rDIST         ⎪
                vcmpnezb.   vMASK,vSRC,vSRC             ⎪
                vclzlsbb    vINDEX,vMASK                ⎪
                mfvsrc      rINDEX,vINDEX               ⎪
                add         rRESULT,rSRC_INDEX,rINDEX   ⎬ 104
                cmp         cr0,rINDEX,rDIST            ⎪
                bltlr       cr0                         ⎪
                add         rSRC_INDEX,rSRC_INDEX,rINDEX⎪
                lxvx        vSRC,rSRC_PTR,rSRC_INDEX    ⎪
do_loop_safe:   vcmpnezb    vMASK,vSRC,vSRC             ⎪
                bf          cr6.ALL_FALSE,EOS_found     ⎪
                addi        rSRC_INDEX,rSRC_INDEX,16    ⎪
                lxvx        vSRC,rSRC_PTR,rSRC_INDEX    ⎪
                b           do_loop_safe                ⎭
```

LOAD DOUBLEWORD INDEXED AUTO-TERMINATION ldxnf    XT,RA,RB

| 31 | RT | RA | RB | XO | / |
|---|---|---|---|---|---|
| 0 | 6 | 11 | 16 | 21 | 31 |

EA ← ((RA=0) ? : GPR[RA]) + GPR[RB]

GPR[RT] ← MEM_AUTO_TERM (EA,8)

LOAD VECTOR INDEXED AUTO-TERMINATION lxvxnf    XT,RA,RB

| 31 | T | RA | RB | XO | TX |
|---|---|---|---|---|---|
| 0 | 6 | 11 | 16 | 21 | 31 |

EA ← ((RA=0) ? : GPR[RA]) + GPR[RB]

VSR[32×TX+T] ← MEM_AUTO_TERM (EA,16)

LGNF    R₁D₂(X₂B₂)    [RXY-3]

| 'E3' | R₁ | X₂ | B₂ | DL₂ | DH₂ | '04' |
|---|---|---|---|---|---|---|
| 0 | 8 | 12 | 16 | 20 | 32 | 40 | 47 |

VLNF    V₁D₂(X₂B₂)    [VRX]

| 'E7' | V₁ | X₂ | B₂ | D₂ | //// | RXB | '06' |
|---|---|---|---|---|---|---|---|
| 0 | 8 | 12 | 16 | 20 | 32 | 36 | 40 | 47 |

OPPORTUNITY OF "AUTO-TERMINATION" LOAD VERSUS CONVENTIONAL LOAD ON STRLEN()

| | WITH CONVENTIONAL LOAD | | WITH "AUTO-TERMINATION" LOAD | |
|---|---|---|---|---|
| strlen: | li | rSRC_INDEX,0 } 102 | li | rSRC_INDEX,0 |
| | andi | rTMP,rSRC_PTR,0x0FFF | | |
| | cmpli | cr0,rTMP,0x0FF0 } 104 | | |
| | bgt | cr0,TakeCare | | |
| do_loop: | lxvx | vSRC,rSRC_PTR,rSRC_INDEX | lxvxnf | vSRC,rSRC_PTR,rSRC_INDEX |
| | vcmpnezb. | vMASK,vSRC,vSRC | vcmpnezb. | vMASK,vSRC,vSRC |
| | bf | cr6.ALL_FALSE,EOS_found } 102 | bt | cr6.ALL_FALSE,do_loop |
| | addi | rSRC_INDEX,rSRC_INDEX,16 | addi | rSRC_INDEX,rSRC_INDEX,16 |
| | addi | rTMP,rTMP,16 } 104 | b | do_loop |
| | cmpli | cr0,rTMP,0x0FF0 | | |
| | bgt | cr0,do_loop } 102 | | |
| eos_found: | vclzlsbb | vEOS_INDEX,vMASK | vclzlsbb | vINDEX,vMASK |
| | mfvsrd | rEOS_INDEX,vEOS_INDEX } 102 | mfvsrd | rINDEX,vINDEX |
| | add | rRESULT,rSRC_INDEX,rEOS_INDEX | add | rRESULT,rINDEX,rSRC_INDEX |
| | blr | | lbzx | rTEST,rSRC_PTR,rRESULT |
| | | | btf | |
| TakeCare: | subfi | rDIST,rTMP,0x1000 | | |
| | add | rSRC_PTR,rSRC_PTR,rSRC_INDEX | | |
| | lxvl | vSRC,rSRC_PTR,rDIST | | |
| | vcmpnezb. | vMASK,vSRC,vSRC | | |
| | vclzlsbb | vINDEX,vMASK } 104 | | |
| | mfvsrc | rINDEX,vINDEX | | |
| | add | rRESULT,rSRC_INDEX,rINDEX | | |
| | cmp | cr0,rINDEX,rDIST | | |
| | bltr | cr0 | | |
| | add | rSRC_INDEX,rSRC_INDEX,rINDEX | | |
| | lxvx | vSRC,rSRC_PTR,rSRC_INDEX | | |
| do_loop_safe: | vcmpnezb | vMASK,vSRC,vSRC | | |
| | bf | cr6.ALL_FALSE,EOS_found | | |
| | addi | rSRC_INDEX,rSRC_INDEX,16 } 104 | | |
| | lxvx | vSRC,rSRC_PTR,rSRC_INDEX | | |
| | b | do_loop_safe | | |

FIG. 6

COMPUTER INSTRUCTIONS FOR LIMITING ACCESS VIOLATION REPORTING WHEN ACCESSING STRINGS AND SIMILAR DATA STRUCTURES

BACKGROUND

The present disclosure relates in general to executing computer instructions that access, read, write and/or load stored data. More specifically, the present disclosure relates to executing computer instructions that limit the access violation reporting that can occur when attempting to access data that span across a memory boundary.

Null-terminated strings are often used in C and other programming languages. A null-terminated string is a contiguous sequence of characters (or elements, or bytes), wherein the last character in the string is a null character (typically a "0" value) that indicates the end of the string. Because an application does not know the actual size or location of a C-style null-terminated string, the application typically accesses, reads and loads null-terminated strings by sequentially accessing, reading and loading individual string characters until a null character is reached.

Memory may be organized into blocks. A single block or page of memory typically shares a common set of address translations and access permissions. Access permissions determine whether an application has privileges to read or write the contents of a memory page. A null-terminated string may be located at any arbitrary address within a memory page, including for example, near the end of a page, spanning a boundary that separates two different pages, or extending up to the end of a page without crossing the page boundary. An application attempting to access a null-terminated string that spans a page boundary must have access permissions for both pages. If the application has access to the first page but not the second page, a page access violation occurs when the application attempts to access the portion of the string located in the second page. In order to protect system integrity, operating systems are typically strict in not allowing applications to access to a page without having the proper access permission. Thus, operating systems typically kill the offending application in response to a page access violation.

Single instruction multiple data (SIMD) processing is a performance enhancement feature that allows one instruction to operate on multiple data items at the same time. Thus, SIMD allows what usually requires a repeated succession of instructions (e.g., a loop) to be performed in one instruction. For a number of string data functions such as a comparison of two different strings or a string copy operation, SIMD has the potential to reduce processing time by processing multiple string characters in parallel. However, much of this reduced processing time is offset by the additional software overhead that is needed in order to avoid the above-described page access violations that would occur if an application attempts a parallel data access and load (e.g., an SIMD load) of data that cross a memory page boundary, wherein the application does not have access privileges to the pages on both sides of the boundary.

SUMMARY

Embodiments are directed to computer implemented method of accessing a data frame. The method includes initiating, by a processor, an access of the data frame. The method further includes, based at least in part on a determination that the data frame is in a first memory block and the processor has access to the first memory block, accessing, by the processor, the data frame. The method further includes, based at least in part on a determination that the data frame spans the first memory block and a second memory block, and further based at least in part on a determination that the processor has access to the first memory block and the second memory block, accessing, by the processor, the data frame. The method further includes, based at least in part on a determination that the data frame spans the first memory block and the second memory block, and further based at least in part on a determination that the processor has access to the first memory block but does not have access to the second memory block, accessing, by the processor, a first portion of the data frame that is in the first memory block, and accessing, by the processor, at least one default character as a replacement for accessing a second portion of the data frame that is in the second memory block.

The above described method may further include the data frame having a null-terminated string of indeterminate length. The null-terminated string includes a data portion and at least one terminator character. The at least one terminator character indicates a termination of the null-terminated string.

The above-described method may further include, based at least in part on the determination that the data frame is in the first memory block and the processor has access to the first memory block, loading the data frame into a target register. The method may further include, based at least in part on the determination that the data frame spans the first memory block and the second memory block, and further based at least in part on the determination that the processor has access to the first memory block and the second memory block, loading the data frame into the target register. The method may further include, based at least in part on the determination that the data frame spans the first memory block and the second memory block, and further based at least in part on the determination that the processor has access to the first memory block but does not have access to the second memory block, loading the first portion of the data frame that is in the first memory block into the target register, and loading the at least one default character into the target register as a replacement for loading the second portion of the data frame into the target register, wherein the at least one default character loaded in the target register represents a termination of the data frame.

The above-described method may further include, based at least in part on a determination that the processor does not have access to the first memory block, raising an access protection violation.

The above-described method may further include making the determination that the processor does not have access to the second memory block by making a detection of an access protection violation. The detection of the access protection violation may be made by detecting that a predetermined bit of an interrupt status register has been set.

Embodiments are further directed to a computer system for accessing a data frame. The system includes a processor configured to initiate an access of the data frame. The processor is further configured to, based at least in part on a determination that the data frame is in a first memory block and processor has access to the first memory block, access the data frame. The processor is further configured to, based at least in part on a determination that the data frame spans a first memory block and a second memory block, and further based at least in part on a determination that the processor has access to the first memory block and the second memory block, access the data frame. The processor is further configured to, based at least in part on a determination that the data frame spans the first memory block and the second memory block, and further based at least in part on a determination that the processor has access to the first memory block but the processor does not have access to the second memory block, access a first portion of the data frame that is in the first memory block, and access at least one default character as a replacement for accessing a second portion of the data frame that is in the second memory block.

The above-described computer system may further include the data frame having a null-terminated string of indeterminate length. The null-terminated string includes a data portion and at least one terminator character. The at least one terminator character indicates a termination of the null-terminated string.

The above-described computer system may further include the processor being further configured to, based at least on part on the determination that the data frame is in the first memory block and the processor has access to the first memory block, load the data frame into a target register. The processor may be further configured to, based at least in part on the determination that the data frame spans the first memory block and the second memory block, and further based at least on part on the determination that the processor has access to the first memory block and the second memory block, load the data frame into the target register. The processor may be further configured to, based at least in part on the determination that the data frame spans the first memory block and the second memory block, and further based at least in part on the determination that the processor has access to the first memory block but does not have access to the second memory block, load the first portion of the data frame that is in the first memory block into the target register, and load the at least one default character into the target register as a replacement for loading the second portion of the data frame into the target register, wherein the at least one default character loaded in the target register represents a termination of the data frame.

The above-described computer system may further include the processor being further configured to, based at least on part on a determination that the processor does not have access to the first memory block, raise an access protection violation.

The above-described computer system may further include making the determination that the processor does not have access to the second memory block by making a detection of an access protection violation. The detection of the access protection violation may be made by detecting that a predetermined bit of an interrupt status register has been set.

Embodiments are further directed to a computer program product for accessing a data frame. The computer program product includes a computer readable storage medium having program instructions embodied therewith, wherein the computer readable storage medium is not a transitory signal per se. The program instructions are readable by a processor circuit to cause the processor circuit to perform a method. The method includes initiating an access of the data frame. The method further includes, based at least in part on a determination that the data frame is in a first memory block and the program instructions have access to the first memory block, accessing the data frame. The method further includes, based at least in part on a determination that the data frame spans the first memory block and the second memory block, and further based at least in part on a determination that the program instructions have access to the first memory block and the second memory block, accessing the data frame. The method further includes, based at least in part on a determination that the data frame spans the first memory block and the second memory block, and further based at least in part on a determination that the program instructions have access to the first memory block but do not have access to the second memory block, accessing a first portion of the data frame that is in the first memory block, and accessing at least one default character as a replacement for accessing a second portion of the data frame that is in the second memory block.

The above-described computer program product may further include the data frame having a null-terminated string of indeterminate length. The null-terminated string includes a data portion and at least one terminator character. The at least one terminator character indicates a termination of the null-terminated string.

The above-described computer program product may further include, based at least in part on the determination that the data frame is in the first memory block and the program instructions have access to the first memory block, loading the first portion of the data frame into a target register. The computer program product may further include, based at least in part on the determination that the data frame spans the first memory block and the second memory block, and further based at least in part on the determination that the program instructions have access to the first memory block and the second memory block, loading the data frame into the target register. The computer program product may further include, based at least in part on the determination that the data frame spans the first memory block and the second memory block, and further based at least in part on the determination that the program instructions have access to the first memory block but do not have access to the second memory block, loading the first portion of the data frame that is in the first memory block into the target register, and loading the at least one default character into the target register as a replacement for loading the second portion of the data frame into the target register, wherein the at least one default character loaded in the target register represents a termination of the data frame.

The above-described computer program products may further include making the determination that the program instructions do not have access to the second memory block by making a detection of an access protection violation. The detection of the access protection violation may be made by detecting that a predetermined bit of an interrupt status register has been set.

The above-described methods, computer systems and computer program products permit speculative loading of data frame elements that extend beyond the end of a string located within the data frame. Abnormal program terminations due to access errors for strings that end close to page boundaries are avoided. String-ending default characters (e.g., terminator characters) are returned for portions of the attempted access that are protected, thereby forcing a conventional termination of null-terminated strings. The application is not made aware of whether the returned default characters reflect initialized space, protected space, or unmapped space. There is no need for software overhead to pre-compute the distance to a page boundary, or for the low-bandwidth serial storage accesses to carefully approach a page boundary. Thus, the benefits of parallel processing operations, such as SIMD, may be more fully realized. There is also increased opportunity to inline a dynamically linked library (DLL) function call. As an optimization, a compiler can in-line the code for a function call into the main program, thereby eliminating the need to go through the additional overhead of saving return addresses and various registers.

Additional features and advantages are realized through techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 1 depicts an example of additional overhead code that is used in order to avoid access violations when using SIMD to access data frames that span across memory boundaries;

FIG. 6 depicts a code implementation of the present disclosure in a side-by-side comparison to additional overhead code that is needed in order to avoid access violations that would occur, without benefit of the present disclosure, when using SIMD to access strings that span across memory boundaries.

DETAILED DESCRIPTION

Figure 2:
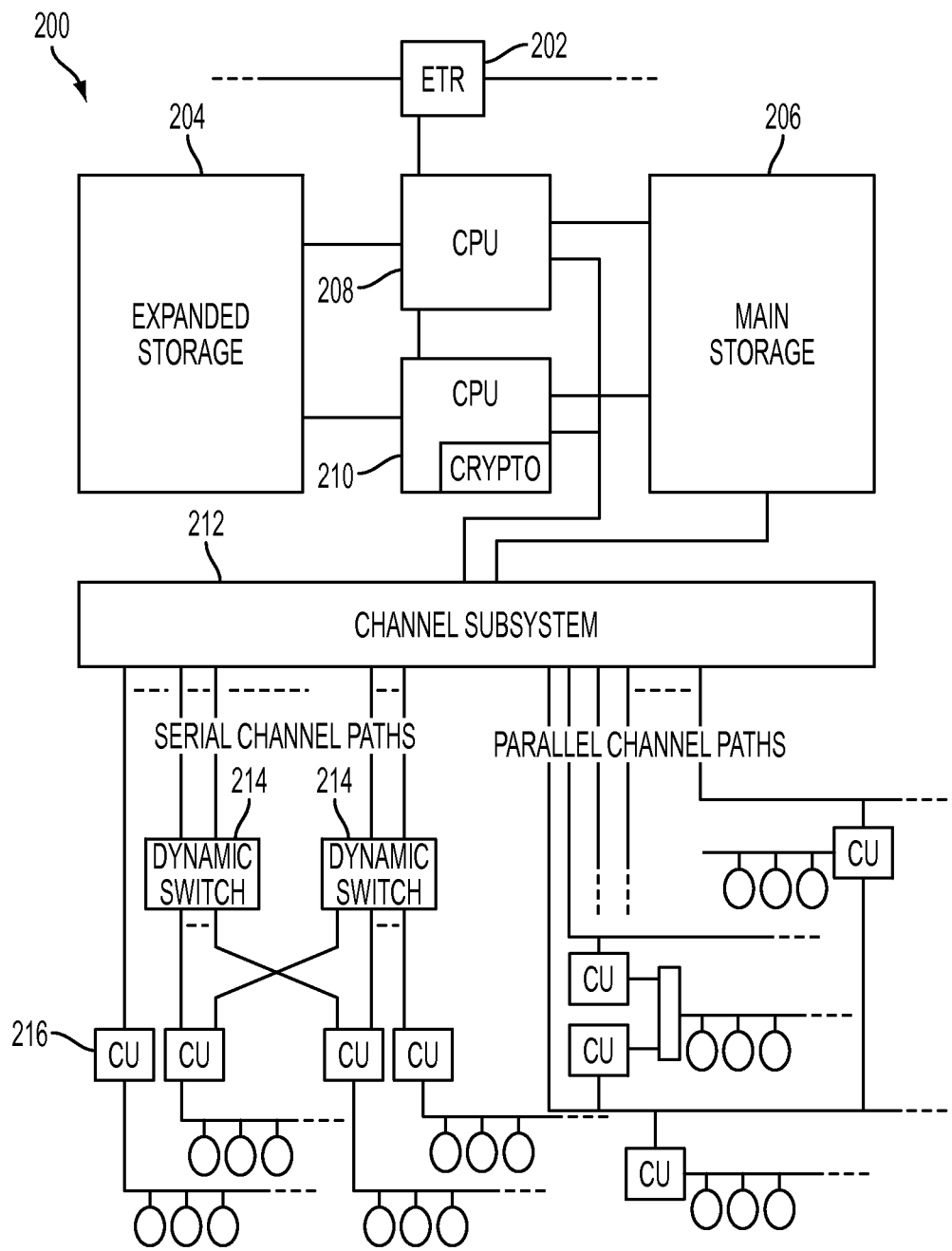
FIG. 2 depicts a logical structure of a z/Architecture system capable of implementing one or more embodiments of the present disclosure.

It is understood in advance that although this disclosure includes references to various computer programming languages (e.g., C, C++, C#, Java, etc.) and instruction set architectures (e.g., z Architecture, Power ISA, etc.), implementation of the teachings recited herein are not limited to any particular computing environment. Rather, embodiments of the present disclosure are capable of being implemented in conjunction with any other type of computing environment now known or later developed. Additionally, although embodiments of this disclosure are described in the context of read operations, the teachings recited herein apply equally to write operations.

The C programming language is a general purpose, procedural, imperative computer programming language developed in the early 1970s for the UNIX operating system. C is a complied language, which means that it must be run through a C compiler to turn the C program into an executable program that the computer can run. A C program, whatever its size, consists of functions, variables and data structures. A function contains statements that specify the computing operations to be done, and variables store values used during the computation. In the C programming language, a data type refers to an extensive system used for declaring variables or functions of different types. A variable's data type determines how much space it occupies in storage and how the bit pattern stored is interpreted. A data structure is a group of data elements grouped together under one name. These data elements, known as characters, can have different types and different lengths.

In the C programming languages, an often used data type is known as a string. In its most basic form, a string is a collection of any arbitrary number of characters (or elements, or bytes). A null-terminated string is a contiguous sequence of characters, wherein the last character is a null character (typically a "0" value) that indicates the end of the string. Null-terminated strings are typically accessed using pointers to the first character in the string. Generally, an application that is processing a C-style null-terminated string does not know the actual size and physical location of the string. Thus, the application keeps accessing and loading individual string characters until a terminator character is reached, thereby indicating the termination of the string.

The simplest type of data structure in computer architecture is a linear array, which consists of a collection of elements (or values, or variables) each identified by at least one array index. A programmer locates and accesses a particular array element by knowing an address and an index. The address identifies a start location of the particular array in memory, and the index identifies how far from the array start address the element is actually located. An array may include more than one dimension. A multi-dimensional array is organized in rows and columns, and is known generally as a matrix. A one-dimensional array is organized in a single row or column, and is known generally as a vector. A null-terminated string is typically a one-dimensional array of characters, wherein a pointer directs the application to a start location of the string. Unlike most other types of arrays, the length (size) of the string is not known. Accessing the string requires an incremental, sequential step through each character of the string/array until a terminator character is reached, thereby indicating the termination (or end) of the string, and from this process the length (size) of the string is determined.

The internal memory structure of contemporary computer architecture includes virtual and physical memory. Virtual memory is a method used by computers to extend their addressable range of memory. Thus, virtual memory is the memory a computer "appears" to have to a program running on the computer, whereas physical or real memory is the memory the computer actually has. Physical memory resides inside the computer and is the only memory directly accessible by the computer's central processing unit (CPU). Program code must reside in physical memory in order to become executable, and program data must reside in physical memory in order to be read or modified.

Because not all of the program code and data need to reside in physical memory at the same time, the portions of the code and data that are not actually being used at the moment do not need to reside in physical memory and can be stored somewhere else until needed. In order to optimize the use of physical memory, a program and its data are broken up into virtual memory blocks called pages. The pages of code and data that are actually being used at the time reside in physical memory, while the rest of the program and data are stored on disk in a special place called the virtual memory page file. Virtual memory is implemented using both hardware and software to map or translate the memory addresses used by a program, called virtual addresses, into physical addresses in computer memory. The main storage as seen by a process or task appears as a contiguous address space or collection of contiguous segments. The operating system manages virtual address spaces and the assignment of physical memory to virtual memory. Address translation hardware in the CPU, often referred to as a memory management unit (MMU), automatically translates virtual addresses to physical addresses.

In the Power ISA operating environment, for example, the MMU translates logical (effective) addresses to physical addresses (referred to as real addresses in the architecture specification) for memory accesses, I/O accesses (most I/O accesses are assumed to be memory-mapped), and direct-store interface accesses. In addition, the Power ISA MMU provides various levels of access protection on a segment and page (or block) basis. Two general types of accesses generated in Power ISA require address translation, namely, instruction accesses and data accesses to memory generated by load and store instructions. Generally, the address translation mechanism is defined in terms of segment descriptors and page tables used by hardware to locate the effective to physical address mapping for instruction and data accesses. The segment information translates the effective address to an interim virtual address, and the page table information translates the virtual address to a physical address.

As a program continues to execute, it eventually comes to a place where it attempts to reference a part of the program or data that isn't in physical memory. When that happens, a page fault interrupt occurs, where program execution stops, and the operating system takes control to handle the interrupt. The page of code or data that is needed is copied from the virtual memory page file into physical memory, the page fault is cleared, and program execution resumes. Page faults are typically transparent to a user, but they can slow down program execution.

Microprocessors may include "no-fault" functionality for processing load instructions. In general, during processing of a load instruction in connection with a "no-fault" operation, if the MMU detects an access violation, it may provide an access fault indication to the microprocessor. Typically a predetermined, default value, such as "zero," will be loaded into the register to be loaded, and the microprocessor will continue processing the program as if the access violation had not been detected. Such no-fault loads always return default data for the entire data to be loaded when any part of the data to be loaded is not accessible (e.g., a page out, no read/write permission, etc.). A load instruction processed in connection with "no-fault" functionality may be referred to as a "no-fault load instruction." Accordingly, conventional no-fault load instructions represent a relatively simple hardware view of whether the data to be accessed is available to hardware, and, when at least one portion of the data to be accessed is not available, return a default value for the entire datum, regardless of whether (1) either a portion of the datum is available, or (2) one or more portions of datum may be made available when paging in.

The address locations in a single block or page of memory share a common set of address translations and access permissions. Because the address locations are often some form of virtual memory address, address translations are needed in order to convert the virtual memory address to a physical or real memory address. Access permissions determine whether the current processor has the appropriate privileges to read or write the contents of a page. As previously noted herein, a string can be of any size and at any location within a memory page. For example, a string can be near the end of a page, it can span a page boundary, or it can extend to the end of the page and not cross the boundary. For conventional situations in which a string spans page boundaries, a program or application attempting to access such a string must have access permission to both pages. Having access permission to the first page but not the second page would cause a page access violation when the application attempts to access the portion of the string located in the second page. Computer languages are typically strict in not allowing access to a page without the proper access permission. Thus, operating systems typically kill the offending application in response to a page access violation.

As noted previously herein, SIMD is a performance enhancement feature that allows one instruction to operate on multiple data items at the same time. Thus, SIMD allows what would usually require a repeated succession of instructions (e.g., a loop) to be performed in one instruction. For a number of string data functions, such as a comparison of two different strings or a string copy operation, SIMD has the potential to reduce processing time by processing multiple string characters in parallel. However, much of this reduced processing time is offset by the additional software overhead that is needed in order to avoid the above-described page access violations that would occur if an application attempts a parallel data load (e.g., an SIMD load) of a string that crosses a memory page boundary, wherein the application does not have access privileges to the pages on both sides of the boundary.

FIG. 1 depicts an example of additional overhead code that is used in a string length (strlen) function in order to avoid access violations when using SIMD to access data that span across memory boundaries. For example, the Power ISA Architecture includes SIMD vector lengths of 128 bits (or 16 bytes, or 16 characters), which provide the ability to load 16 characters at a time, in conjunction with an exemplary commonly employed 8 bit character size for many alphabet-based languages and codes, including those encoded using, for example, the US ASCII standard and the ISO 8859 standard, as well as codes such as the IBM EBCDIC code standard used by z/Architecture mainframes, the KOI8-R standard used for Russian Cyrillic, or VISCII, which is the Vietnamese Standard Code for Information Interchange. As shown in FIG. 1, a SIMD storage access code 100 includes base storage access code 102 that performs the SIMD load. Additional overhead code 104 takes measures to prevent the above-described page access violations that would occur if an application attempts an SIMD load of a string that crosses a memory page boundary, wherein the application does not have access privileges to the pages on both sides of the boundary. For example, in the Power ISA architecture, additional overhead code 104 would in operation continuously check the distance from the current memory address to the end of the page. If the distance check determines that the current memory address is greater than 16 bytes in distance from the end of a page boundary, the application knows it can safely perform a vector load without crossing the page boundary. If the distance check determines that the current memory address is less than 16 bytes in distance from the end of a page boundary, the application knows it cannot safely perform a vector load without crossing the page boundary. The application must then invoke an alternative routine to avoid a page access violation, or may simply take the page access violation for this case. As shown in FIG. 1, additional overhead code 104 adds a significant amount of overhead to the overall processing cost. As noted above, the need to provide additional overhead code 104 offsets much of the reduced processing time that is gained from incorporating SIMD load operations into string processing.

The present disclosure provides computer instructions, which may be implemented as a function call, that limit the access violation reporting that can occur when attempting to access a data that span across a memory boundary. Typically, the data include a string such as a null-terminated string of indeterminate length. An attempt by an application to access data that span across a memory boundary returns an access page violation if the application does not have access permission to the memory blocks on both sides of the memory boundary. Under one or more embodiments of the present disclosure, a new "auto-termination" or "auto-terminating" instruction methodology is proposed and referenced herein as "MEM_AUTO_TERM." The term MEM_AUTO_TERM is a shorthand notation for "perform a memory access that returns valid data automatically completed with terminator(s)." The selection of the name for this instruction methodology is not critical. Any other name may be selected without departing from the scope of the present disclosure.

In operation, the auto-termination load instruction methodology in one or more embodiments attempts to access from memory and load to a target register data that includes a string. In one or more embodiments, the string is a null-terminated string. In one or more embodiments, the access is a serial operation, wherein the bytes that make up the data are accessed one at a time. In one or more embodiments, the access is a parallel operation, wherein the bytes that make up the data are accessed at the same time in blocks or frames. One example of a suitable parallel operation is an SIMD operation. Because the data that contain the string span from a first memory block across a memory block boundary into a second memory block, the application that attempts to access the data must have access permission for the first memory block and the second memory block. If the application has access to the first memory block and does not have access to the second memory block, the attempted access of the second memory block begins a process that would, without benefit of the present disclosure, ordinarily end in a conventional page access violation.

In one or more embodiments, the present disclosure modifies the conventional page access violation process to allow the disclosed auto-termination load instruction methodology to replace the conventional page access violation process when the access violation was initiated by the auto-termination load instruction. The auto-termination load instruction methodology accesses and loads the portion of the data that is in the first memory block to which the application has access. The auto-termination load instruction methodology further accesses and loads at least one default character as a replacement for accessing and loading the portion of the data frame that is in the second memory block to which the application does not have access.

In one or more embodiments, the modifications that allow the auto-termination load instruction methodology to replace the conventional page access violation process proceeds as follows. The application's attempt to access the second memory block to which the application does not have access initiates a new form of data storage interrupt (DSI). An interrupt handler processes the new form of DSI. In general, the interrupt handler is a section of a computer program or an operating system that takes control when an interrupt is received and performs the operations required to service the interrupt. To assist the interrupt handler, the specific cause of the DSI is indicated by hardware setting a new auto-termination load access violation status bit in an interrupt status register such as a data storage interrupt status register (DSISR) of the Power ISA. The computer hardware is configured to allow the auto-termination load access violation status bit to be set by the disclosed MEM_AUTO_TERM instruction methodology. The interrupt handler is configured to check the auto-termination load access violation status bit to determine whether to take special actions for this DSI without requiring examination and decoding of the offending instruction operation code (op code) to make that determination. If the auto-termination load access violation status bit is set, the auto-termination load instruction of the present disclosure is indicated. Accordingly, based at least in part on the auto-termination load access violation status bit being set, the first portion of the data is accessed from the first memory block and loaded to a target vector register, and at least one default characters is loaded into the target vector register as a replacement for accessing and loading the second portion of the data.

Thus, one or more embodiments of the present disclosure permit speculative loading of data frame elements that extend beyond the end of a string located within the data frame. Abnormal program terminations due to access errors for strings that end close to page boundaries are avoided. String-ending default characters (e.g., terminator characters) are returned for portions of the attempted access that are protected, thereby forcing a conventional termination of null-terminated strings. The application is not made aware of whether the returned default characters reflect initialized space, protected space, or unmapped space. There is no need for software overhead (e.g., additional overhead code 104 shown in FIG. 1) to pre-compute the distance to a page boundary, or for the low-bandwidth, serial storage accesses to carefully approach a page boundary. Thus, the benefits of parallel processing operations, such as SIMD, may be more fully realized. There is also increased opportunity to inline a dynamically linked library (DLL) function call. As an optimization, a compiler can in-line the code for a function call into the main program, thereby eliminating the need to go through the additional overhead of saving return addresses and various registers because the application can execute the in-line instruction rather than a series of instructions.

The present disclosure may be implemented in a system z/Architecture ISA (instruction set architecture) or a Power ISA™ or any other architecture that supports memory access protection. FIG. 2 depicts, as an example, a logical structure of a z/Architecture system 200 capable of implementing one or more embodiments of the present disclosure. As shown, system 200 includes an external time reference (ETR) 202, an expanded storage 204, a main storage 206, a first central processing unit (CPU) 208, a second CPU 210, a channel subsystem 212, dynamic switches 214 and control units (CUs) 216 (for ease of illustration only one reference number for the CUs is shown), configured and arranged as shown. Specifically, expanded storage 204 and main storage 206 include array structures that are located and accessed according to an array index computation. Additional details of the overall operation of system 100 and a z/Architecture in general are disclosed in the following publications: *z/Architecture Principles of Operation*, Seventh Edition (February, 2008); and *z/Architecture Principles of Operation*, Tenth Edition (September 2012). Additional details of a Power ISA implementation of system 200 are disclosed in *Power ISA Version* 2.07 (May 10, 2013). Additional Power ISA documents are available via the World Wide Web at www.power.org. The entire disclosure of each of the above-referenced publications is incorporated by reference herein in its entirety.

Under one or more embodiments of the present disclosure, a new auto-termination load instruction methodology is proposed and referenced herein as MEM_AUTO_TERM. The disclosed auto-termination load instruction methodology provides computer instructions, which may be implemented as a function call, that limit the access violation reporting that can occur when attempting to access a data that span across a memory boundary. In computer programming, a function is a self-contained software routine that performs a task. Functions can perform a large amount of processing or a small amount of processing such as adding two numbers and deriving a result. Values are passed to the function, and values may be returned. Alternatively, the function may just perform the operation and not return a resulting value. The benefit of incorporating a function within a program is that, once written, it can be used over and over again without the programmer having to duplicate the same lines of code in the program each time that same processing is desired. Programming languages provide a set of standard functions as well as allow programmers to define their own functions. For example, the C and C++ programming languages are built almost entirely of functions and always contain a "main" function. Functions in one program can also be called for by other programs and shared. For example, an operating system (OS) can contain more than a thousand functions to display data, print, read and write disks and perform myriad tasks. Programmers write their applications to interact with the OS using these functions. This list of functions is called the "application programming interface" (API). Functions are activated by placing a "function call" statement in the program. The function call may or may not include values (parameters) that are passed to the function. When called, the function performs the operation and returns control to the instruction following the call.

Figure 3A:
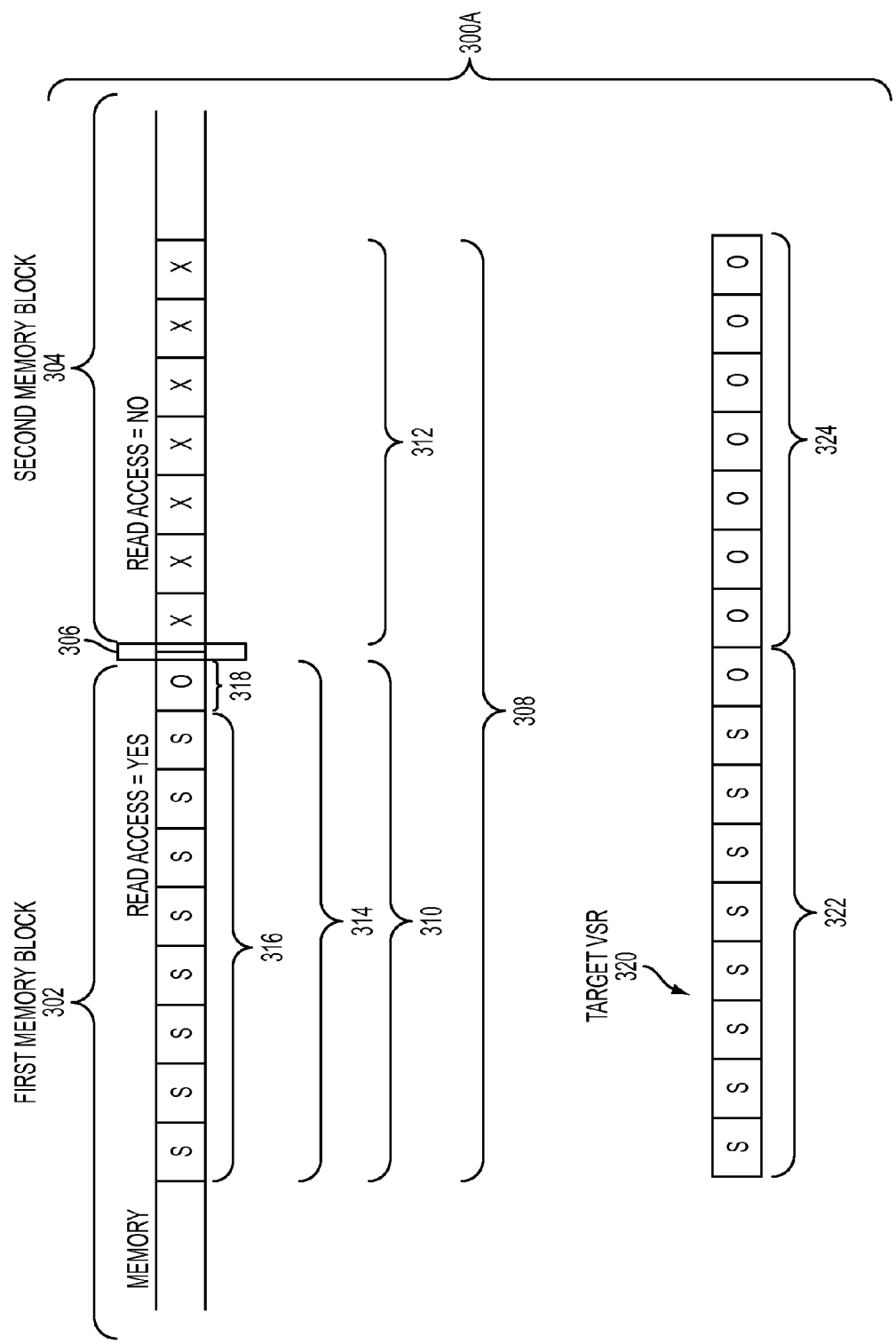
FIG. 3A depicts a diagram illustrating an example of a memory access using a string load instruction having auto-termination capabilities according to one or more embodiments.
Figure 3B:
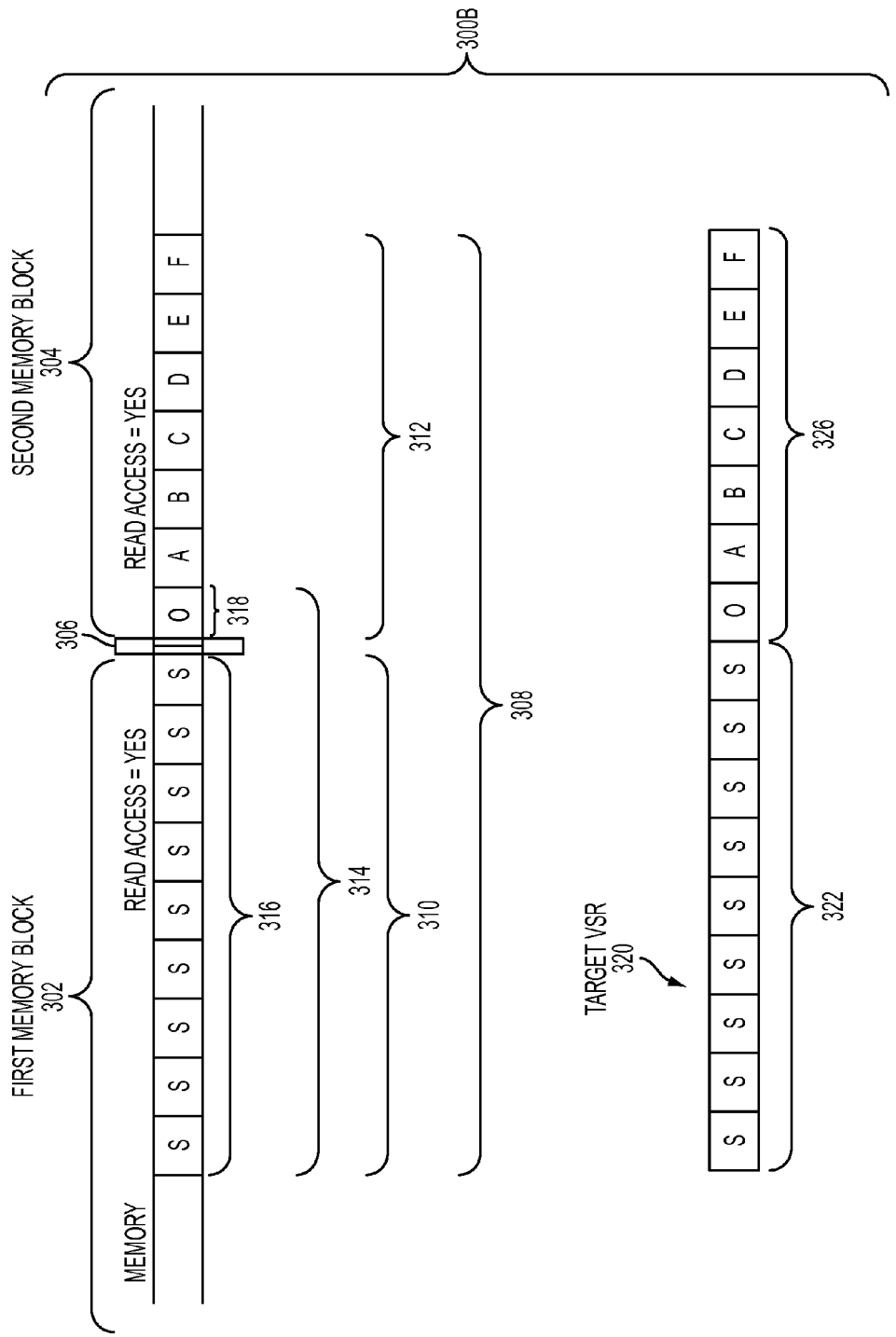
FIG. 3B depicts a diagram illustrating another example of a memory access using a string load instruction having auto-termination capabilities according to one or more embodiments.
Figure 3C:
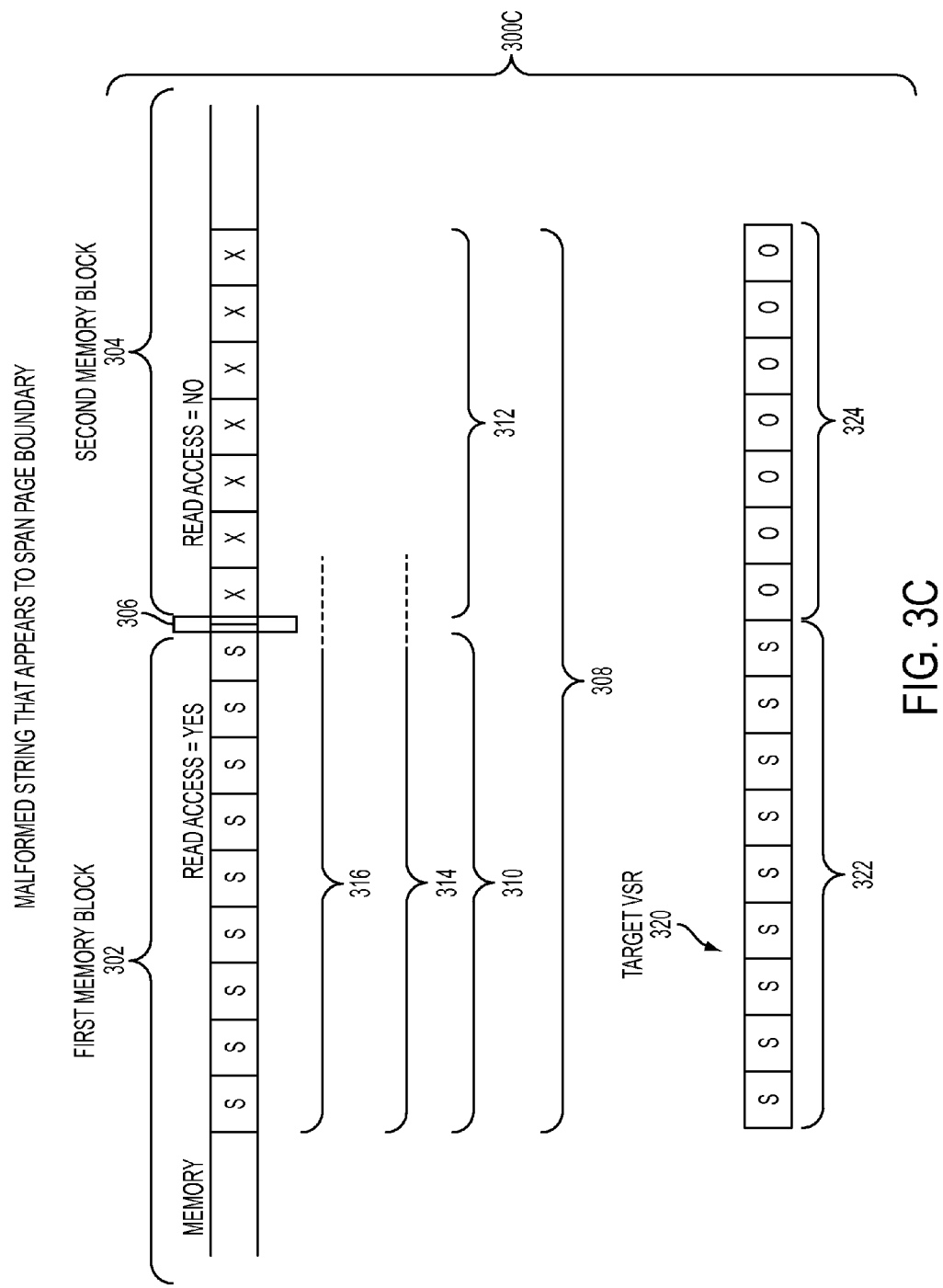
FIG. 3C depicts a diagram illustrating another example of a memory access using a string load instruction having auto-termination capabilities according to one or more embodiments.

FIGS. 3A to 3C depict diagrams 300A, 300B, 300C that illustrate example operations of the disclosed auto-termination load instruction methodology according to one or more embodiments. As shown in FIG. 3A, diagram 300A includes a first memory block 302, a second memory block 304, a memory block boundary 306, a data frame 308, a first portion 310 of data frame 308, a second portion 312 of data frame 308, a null-terminated string 314, a data portion of null-terminated string 316, a terminator character 318, a vector register 320, a loaded first portion 322 of data frame 308 and loaded default characters 324, configured and arranged as shown. Data frame 308 is 16 bytes long starting 9 bytes from the end of first memory block 302, spanning across memory block boundary 306 and extending 7 bytes into second memory block 304. Generally, data frame 308 corresponds to a vector length that can be accessed from a source in parallel and loaded to a target in parallel. For example, the Power ISA Architecture includes SIMD vector lengths (i.e., data frames) of 128 bits (or 16 bytes, or 16 characters), which provide the ability to load 16 characters at a time. First portion 310 of data frame 308 is in first memory block 302, and second portion 312 of data frame 308 is in second memory block 304. Within data frame 308 is null-terminated string 314, which includes a data portion 316 and terminator character 318. For the example shown in diagram 300A, null-terminated string 314 is 9 bytes in length and located at the last 9 bytes of first memory block 302. As previously noted herein, a null-terminated string typically may have any size and location, and the application that needs to access and load the null-terminated string does not generally know the size of the null-terminated string. The application knows it has reached the end of a null-terminated string by detecting the terminator character provided at the end of the string. Within first and second memory blocks 302, 304, as well as vector register 320, the following notations are used. An "S" represents a string data character. An "X" represents a character located in a memory block to which the application does not have access permission. A "0" represents a terminator character that identifies a termination of the preceding string.

Continuing with the example shown in diagram 300A, the application has access permission to read and load data from first memory block 302 but does not have access permission to read and load data from second memory block 304. Using the auto-termination load instruction methodology of the present disclosure, the application does not need to include additional code (e.g., additional overhead code 104 shown in FIG. 1) that takes measures to prevent the page access violations that would occur in an application that attempts an SIMD load of a string that crosses a memory page boundary, wherein the application does not have access privileges to the pages on both sides of the boundary. As previously noted herein, the additional overhead code would in operation continuously check the distance from the current memory address to the end of the page. If the distance check determines that the current memory address is greater than 16 bytes in distance from the end of a page boundary, the application knows it can safely perform a vector load without crossing the page boundary. If the distance check determines that the current memory address is less than 16 bytes in distance from the end of a page boundary, the application knows it cannot safely perform a vector load without crossing the page boundary. The application must then invoke an alternative routine to avoid a page access violation, or simply accept the page access violation. As shown in FIG. 1, additional overhead code 104 adds a significant amount of overhead to the overall processing cost, and the need to provide additional overhead code 104 offsets much of the reduced processing time that is gained from incorporating SIMD load operations into string processing. Using the auto-termination load instruction methodology of the present disclosure avoids the need for additional overhead 104 and allows the application to realize the decreased processing times that result from utilizing parallel SIMD vector load operations.

Continuing with the example shown in diagram 300A, the application has access permission to first memory block 302 and is in the process of accessing data frames from first memory block 302 then reading and loading the accessed data frames to target registers. A next access operation of the application is to access data frame 308 then read and load it to vector register 320. Data frame 308 begins at the end of first memory block 302, spans across memory block boundary 306 and extends into second memory block 304. The application has access permission for first memory block 302 but does not have access permission to second memory block 304. Because of the additional overhead costs, applications do not typically devote code to checking access permissions before every data access attempt. Thus, the application's attempt to access data frame 308 (more specifically, second portion 312 of data frame 308 from second memory block 302) causes a page fault and initiates a data storage interrupt (DSI).

In response to a DSI initiated by the disclosed auto-termination load instruction methodology, a new form of DSI is initiated. In general, a DSI occurs when a processor attempted to perform a storage access (load or store) and a problem was detected during the address translation process. In the Power ISA, for example, the causes of a DSI include, but are not limited to, the following: the data address translation is enabled and the virtual address of any byte of a specified storage location cannot be translated to a physical address; the specified effective address refers to storage that is "Write Through Required" or "Cache Inhibited" (caused only by some classes of storage accesses); a "Data Access Breakpoint" match occurs; or the access violates storage protection. Except for the later cause, wherein the access violates storage protection, the former causes are handled by the operating system (or hypervisor) in the manner defined in their original function. In other words, the auto-termination load instruction methodologies of the present disclosure do not modify how the former causes are processed. The later cause differs from the former causes in that a translation is actually found, however the application is not permitted to perform the storage access. The auto-termination load instruction methodologies of the present disclosure modify how the later cause (i.e., the access violates storage protection) is handled under certain conditions as described in the following paragraph.

When a DSI occurs, an interrupt handler processes the DSI. In general, an interrupt handler is a section of a computer program or an operating system that takes control when an interrupt is received and performs the operations required to service the interrupt. To assist the interrupt handler, the specific cause of the DSI is indicated by hardware setting a particular status bit in an interrupt status register such as the data storage interrupt status register (DSISR) in the Power ISA. The computer hardware, according to the present disclosure, is configured to allow certain bits of the interrupt status register that assists the interrupt handler to only be set by specific instructions. For example, in the Power ISA, certain bits can be set only by specific instructions. The auto-termination load instruction methodologies of the present disclosure adds a new bit, referred to herein as an auto-termination load access violation status bit, to an interrupt status register, such as the DSISR for Power ISA, that is set if the DSI was caused by execution of the disclosed auto-termination load instruction. The auto-termination load instruction methodologies of the present disclosure configure the interrupt handler to check the auto-termination load access violation status bit to determine whether to take special actions for this DSI without requiring examination and decoding of the offending instruction op code to make that determination. Thus, using the auto-termination systems and methodologies of the present disclosure, the page access violation illustrated in FIG. 3A initiates an interrupt that sets a special bit in the DSISR to indicate the auto-termination load instruction of the present disclosure. For ease of reference, the special bit that is set in the DSISR in response to the page access violation illustrated in FIG. 3A shall be referred to as an auto-termination bit.

As applied to the example shown in diagram 300A of FIG. 3A, the disclosed auto-termination systems and methodologies proceed as follows. It is noted, however, that sequence or order of operations implied by the descriptions herein are provided for ease of explanation and illustration. It will be understood by persons skilled in the relevant art that, in application, the actual order in which stored characters are accessed, read, loaded, written or stored will vary depending on number of factors, including but not limited to, the actual application, the chosen computer architecture and whether the operations are performed in serial or in parallel. The application attempts to access first and second memory blocks 302, 304, read data frame 308 from memory, and load data frame 308 into vector register 320. Because data frame 308 spans first memory block 302 and second memory block 304, the attempt to access data frame 308 initiates a DSI and sets the auto-termination load access violation status bit in the DSISR. The interrupt handler, which is now configured to check the auto-termination load access violation status bit in response to a DSI, proceeds as follows when it determines that the auto-termination load access violation status bit is set. First portion 310 of data frame 308 is accessed and read from first memory block 302, then loaded into vector register 320. First portion 310 includes null-terminated string 314, which includes data portion 316 and terminator character 318. In place of accessing and reading second portion 312 of data frame 308, default characters 324 are accessed and read from a predetermined location, then loaded into vector register 320 as a replacement for accessing, reading and loading second portion 312 of data frame 308. Accordingly, based at least in part on the auto-termination bit being set in the DSISR, first portion 310 of data frame 308 is accessed from first memory block 302 and loaded as loaded first portion 322 into vector register 320, and default characters 324 are loaded into vector register 320 as a replacement for accessing and loading second portion 312 of data frame 308.

As applied to the example shown in diagram 300A of FIG. 3A, the disclosed auto-termination load instruction methodology allows an application to perform the access across memory block boundary 306 without taking a page access error. Because the complete null-terminated string 314 (data portion 316 and terminator character 318) is in a memory block to which the application has access (first memory block 302), the correct null-terminated string is loaded into vector register 320, and the application avoids taking a page access violation error, which would potentially kill the application. The disclosed auto-termination load instruction methodology facilitates the incorporation of SIMD vector load operations that reduce processing time by processing multiple string characters in parallel. The disclosed auto-termination load instruction methodologies allow the application to avoid the inclusion of additional code (e.g., additional overhead code 104 shown in FIG. 1) that takes measures to prevent the page access violations that would occur in an application that attempts an SIMD load of a string that crosses a memory page boundary, wherein the application does not have access privileges to the pages on both sides of the boundary. Thus, the reduced processing time from incorporating SIMD vector loading is not offset by the additional software overhead that is needed in order to avoid the above-described page access violations that would occur in an application that attempts a parallel data load of a string that crosses a memory page boundary, wherein the application does not have access privileges to the pages on both sides of the boundary.

Although diagram 300A is described in connection with parallel vector load operations, the teachings of the present disclosure also apply to serial load operations. In a serial load operation, each byte of data frame 308 and null-terminated string 314 would be loaded individually until terminator character 318 is reached, which indicates a termination of null-terminated string 314. The application would then attempt to access a next byte, which is in second memory block 302 to which the application does not have access permission. The application's attempt to read from second memory block 302 would initiate the same above-described interrupt that sets a special bit in the DSISR to indicate the auto-termination load instruction of the present disclosure. As applied to the serial implementation of the example shown in diagram 300A of FIG. 3A, the auto-termination load instruction methodology of the present disclosure proceeds as follows. In place of accessing and loading a first byte of second portion 312 of data frame 308 from second memory block 304 to vector register 320, at least one default character (e.g., at least one of default characters 324) is loaded into vector register 320 as a replacement for accessing and loading second portion 312 of data frame 308. Accordingly, based at least in part on the auto-termination load access violation status bit being set in the DISIR, first portion 310 of data frame 308 is accessed from first memory block 302 and loaded as loaded first portion 322 into vector register 320, and at least one default character is loaded into vector register 320 as a replacement for accessing and loading second portion 312 of data frame 308.

Turning now to FIG. 3B, diagram 300B illustrates an example of how null-terminated string 314 would be accessed and loaded when the application has access to first memory block 302 and second memory block 304. Similar to diagram 300A shown in FIG. 3A, diagram 300B includes first memory block 302, second memory block 304, memory block boundary 306, data frame 308, first portion 310 of data frame 308, second portion 312 of data frame 308, null-terminated string 314, data portion 316 of null-terminated string 314, terminator character 318, vector register 320 and loaded first portion 322 of data frame 308, configured and arranged as shown. Additionally, diagram 300B includes a loaded second portion 326 of data frame 308. Thus, diagram 300B is substantially the same as diagram 300A except for the following differences. First, the application in diagram 300B has access permission to second memory block 304. Second, null-terminated string 314 in diagram 300B is 10 bytes in length and located at the last 9 bytes of first memory block 302 and the first byte of second memory block 304. Third, within second memory block 304, as well as vector register 320, alphabet letters A, B, C, D, E and F are used to represent additional data characters that are part of data frame 308 but appear immediately after null-terminated string 314. Because the application in diagram 300B has access permission to read and load data from first and second memory blocks 302, 304, the auto-termination load instruction operation of the present disclosure is not invoked, and the application performs its access and load operations in a conventional manner. However, the presence of the auto-termination load instruction operation still provides benefits during conventional access and load operations in that the application still does not need to include additional code (e.g., additional overhead code 104 shown in FIG. 1) that takes measures to prevent the page access violations that would occur if an application attempts an SIMD load of a string that crosses a memory page boundary, wherein the application does not have access privileges to the pages on both sides of the boundary. Thus, even when the auto-termination load instruction operation of the present disclosure is not invoked, the presence of the auto-termination load instruction operation still allows the application to avoid the need for additional overhead 104 (shown in FIG. 1), and further allows the application to realize the decreased processing times that can result from utilizing parallel SIMD vector load operations.

Turning now to FIG. 3C, diagram 300C illustrates an example of how null-terminated string 314 would be accessed and loaded according to the disclosed auto-termination load instruction methodology when null-terminated string 314 does not terminate in first memory block 302 and the application has access permission to first memory block 302 but does not have access permission to second memory block 304. Similar to diagram 300A shown in FIG. 3A, diagram 300C includes first memory block 302, second memory block 304, memory block boundary 306, data frame 308, first portion 310 of data frame 308, second portion 312 of data frame 308, null-terminated string 314, data portion 316 of null-terminated string 314, vector register 320, loaded first portion 322 of data frame 308 and loaded default characters 324, configured and arranged as shown. All aspects of diagram 300C are the same as diagram 300A except that null-terminated string 314 and data portion 316 of null-terminated string 316 in diagram 300C are each at least 9 bytes in length, but the actual lengths are indeterminate because null-terminated string 314 and data portion 316 of null-terminated string 314 continue into second memory block 304 to which the application does not have access permission. Thus, the location of the terminator character of null-terminated string 314 is unknown.

Diagram 300C is an example of a malformed string, wherein the string spans a memory block boundary and extends into a memory block to which the application does not have access. This is a programming error that needs to be identified and corrected. However, for the example shown in diagram 300C, the attempt to access data frame 308 initiates a DSI and sets the auto-termination load access violation status bit in the DSISR. The interrupt handler, which under the present disclosure is now configured to check the auto-termination load access violation status bit in response to a DSI, proceeds as described above in connection with diagram 300A. First portion 310 of data frame 308 is accessed and read from first memory block 302, then loaded into vector register 320. First portion 310 includes data portion 316 of null-terminated string 314, which for the example shown in FIG. 3C does not include a terminator character. Accordingly, the length of data portion 316 of null-terminated string 314 is indeterminate. In place of accessing and loading second portion 312 of data frame 308 from second memory block 304 to vector register 320, default characters 324 are loaded into vector register 320 as a replacement for accessing and loading second portion 312 of data frame 308. Accordingly, based at least in part on the auto-termination load access violation status bit being set in the DSISR, first portion 310 of data frame 308 is accessed from first memory block 302 and loaded as loaded first portion 322 into vector register 320, and default characters 324 are loaded into vector register 320 as a replacement for accessing and loading second portion 312 of data frame 308.

In order to identify the malformed null-terminated string shown in FIG. 3C, the auto-termination instruction methodologies of the present disclosure may further configure the interrupt handler to perform an additional check to identify whether it loaded a null-terminated string that is in fact a malformed string. For example, the interrupt handler may be further configured to perform a reload in a conventional manner (i.e., not the disclosed auto-termination instruction that would set the auto-termination violation status bit in DSISR) of the first default character to the target vector register at the same address. If the during the conventional reload of the first default character the application has read access to that address location, the application determines that the string was not a malformed string. If the during the conventional reload of the first default character the application does not have read access to that address location, the application determines that the string was malformed, takes the access violation exception and interrupt, and the operating system terminates the application.

Alternatives to the above-described methodologies for modifying an interrupt handling procedure to invoke the auto-termination instruction methodology in accordance with the present disclosure include providing a new register that captures the opcode of the offending instruction. This approach avoids the need to set up the storage access to load the opcode of the offending instruction into a GPR. However, the opcode would still need to be manually decoded to differentiate it from other storage access instructions. Additionally, a new DSISR bit could be provided that indicates an "auto-termination" load instruction caused the interrupt. This approach eliminates the overhead of loading and decoding the opcode of the offending instruction. However, it still requires the interrupt handler to sort through other possible causes of the data storage interrupt because some of the other possible causes may be considered higher priority and would therefore need to be ruled out before examining the bit for an "auto-termination" load. A new, dedicated "auto-termination" data storage interrupt that is triggered only by an "auto-termination" load would eliminate all overhead, permitting the interrupt handler to immediately proceed to implement the function without having to rule out other causes. Such an interrupt would still need to process paged-out operations, but would not have to sort through other special cases presented by other forms of storage access instructions.

Figure 4A:
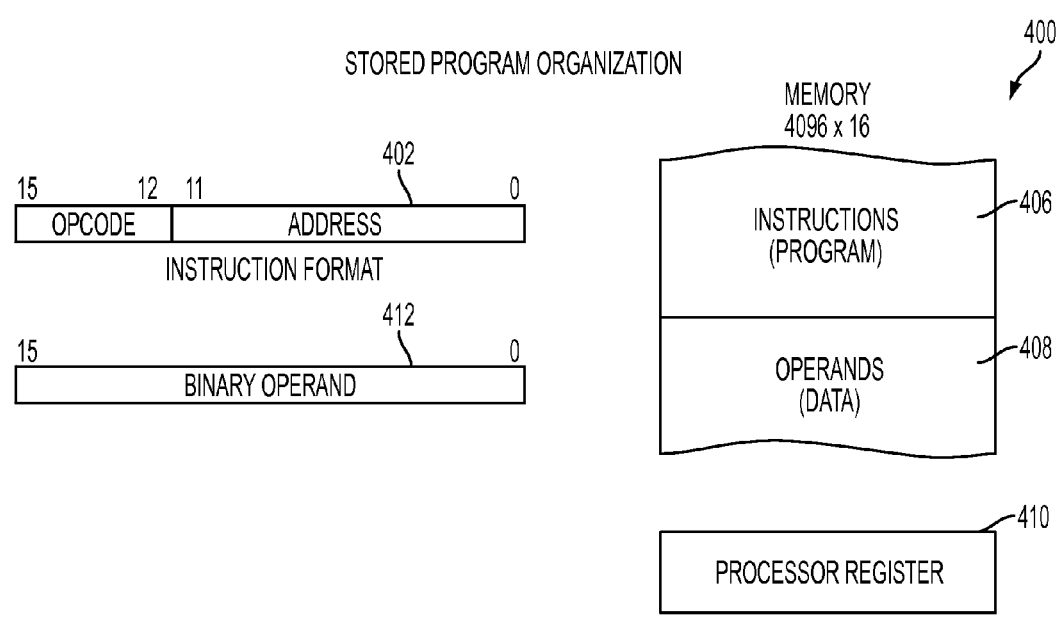
FIG. 4A depicts a general example of a stored program organization scheme and instruction code format capable of implementing one or more embodiments.

FIG. 4A depicts a basic example of a general stored program organization scheme 400 and instruction code format 402 capable of implementing one or more embodiments of the auto-termination systems and methodologies of the present disclosure. Stored program organization scheme 400 includes a memory 404, instruction memory locations 406, operand memory locations 408 and a processor register 410, configured and arranged as shown. Computer instructions in the form of instruction codes 402 are typically stored in consecutive locations of instruction memory 406 and executed sequentially at processor register 410. An instruction code is generally a group of bits that instruct the computer to perform a specific operation. Instruction codes may have a variety of formats. Instruction code format 402 includes an operation code (op code) field and an address field. The operation code is the portion of a machine language instruction that specifies the operation to be performed. The address field specifies operands, registers or memory words. The address field is often used not as an address but as the actual operand (e.g., binary operand 412). When the address field of an instruction code specifies an operand, the instruction is said to have an immediate operand. The effective address under this scenario may be the address of the operand in a computational-type instruction or the target address in a branch-type instruction.

Figures 4B, 4C, 4D, 4E:
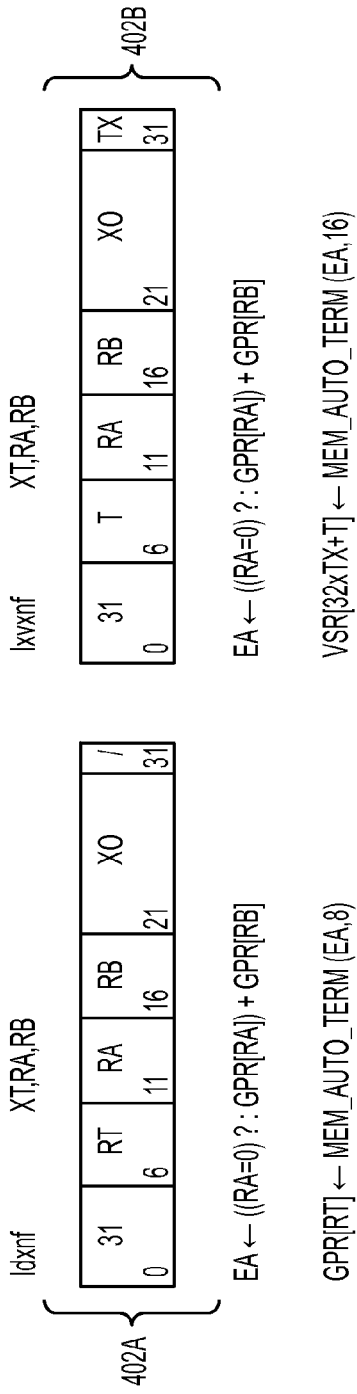
FIG. 4B depicts an example instruction code format for accessing and loading data in a Power Instruction Set Architecture (ISA) according to one or more embodiments.
FIG. 4C depicts another example instruction code format for accessing and loading data in a Power ISA according to one or more embodiments.
FIG. 4D depicts an example instruction code format for accessing and loading data in a z/Architecture according to one or more embodiments.
FIG. 4E depicts another example instruction code format for accessing and loading data in a z/Architecture according to one or more embodiments.

FIGS. 4B, 4C, 4D and 4E depict example instruction operation code formats 420A, 420B, 420C, 420D, respectively, for accessing and loading data according to one or more embodiments. More specifically, instruction operation code formats 420A, 420B utilize the Power ISA format, and instruction code formats 420C and 420D utilize the z/Architecture format. Instruction code 420A shown in FIG. 4B and instruction code 420C shown in FIG. 4D are general purpose register (GPR) type load instructions. Instruction code 420B shown in FIG. 4C and instruction code 420D are vector register type load instructions. Although different register names and general formatting details are used in the Power ISA and z/Architecture formats, the functionality of instruction operation code formats 420A through 420D are substantially the same. Accordingly, as an example, instruction code 420A of FIG. 4B is described in greater detail in the following paragraphs. Additional details of the z/Architecture instruction code formats 420C, 420D shown in FIGS. 4D and 4E and a z/Architecture in general are disclosed in the following publications: *z/Architecture Principles of Operation*, Seventh Edition (February, 2008); and *z/Architecture Principles of Operation*, Tenth Edition (September 2012). The entire disclosure of each of the above-referenced publications is incorporated by reference herein in its entirety.

Turning now to FIG. 4B, the first syntax line shown as "ldxnf" is the mnemonic of the instruction code. Following the instruction mnemonic are the operands RT, RA and RB. RT is a number from zero to 31 that corresponds to the target register, i.e., the target GPR that would receive the data that is being loaded from memory. Thus, RT specifies one of 32 possible GPRs to receive the load data. RA and RB are symbols for GPRs that are used as source operands. The contents of RA and RB are added together to form the address of the load instruction.

Instruction code 420A is encoded in a fixed 32 bit format. The leftmost field from bits zero through 5 is the primary operation code field. The next field from bits 6 through 10 is the RT field, wherein the target register (GPR in this example) is specified. As a 5 bit field, RT can be encoded with a value from zero through 31. The next field from bits 11 through 15 is the RA field, which corresponds to the RA operand and specifies one of the GPRs that is used to calculate the address of the load. The next field from bits 16 through 20 is the RB field, which specifies a second GPR, and is added to the RA field to produce the effective address of the memory access. The field from bits 21-30 is the extended operation code field (XO). The extended operation code field is a unique value that will identify this particular instruction. As a 10 bit field, the extended operation code may have any one of 2048 possible values. The last field is a 1 bit field at bit 31. The slash in bit field 31 identifies that bit 31 is not used by this particular instruction code.

Below instruction code 420A is a register transfer language (RTL) representation of the auto-termination load instruction identified by instruction code 420A. The first line is a statement that describes how the effective address (EA) of the load is calculated. Generally, a left pointing arrow indicates an assignment. Thus, the statement R2←R1 denotes a transfer of the content of register R1 into register R2. By definition, the content of the source register R1 does not change after the transfer. If zero is specified for the RA operand, the value zero is used instead of the contents of GPR [RA]. If zero is not specified for the RA operand, the contents of GPR [RA] are used instead of zero. Either zero or the contents of GPR [RA] is added to the contents of GPR [RB] to calculate the EA of the load instruction. A subsequent address translation operation (not shown) translates EA to a virtual address (VA), and translates VA to a physical address. The determination of whether an application that is attempting to access a particular page has read/write access is usually incorporated as part of the address translation. The next line actually performs the memory address translation, wherein the MEM_AUTO_TERM instruction methodology uses the EA as the address of the operation. The 8 denotes the accessing of a total of 8 bytes at that address in memory. Thus, the MEM_AUTO_TERM instruction methodology performs a translation on the address, checks to determine if the application has read or write access, performs the access to memory where access permission is valid, returns 8 bytes, and places those 8 bytes in GPR [RT]. As previously noted, the name "MEM_AUTO_TERM" is a shorthand notation for "perform a memory access that returns valid data automatically completed with terminator(s)." The selection of the name for this instruction methodology is not critical. Any other name may be selected without departing from the scope of the present disclosure.

Figure 5:
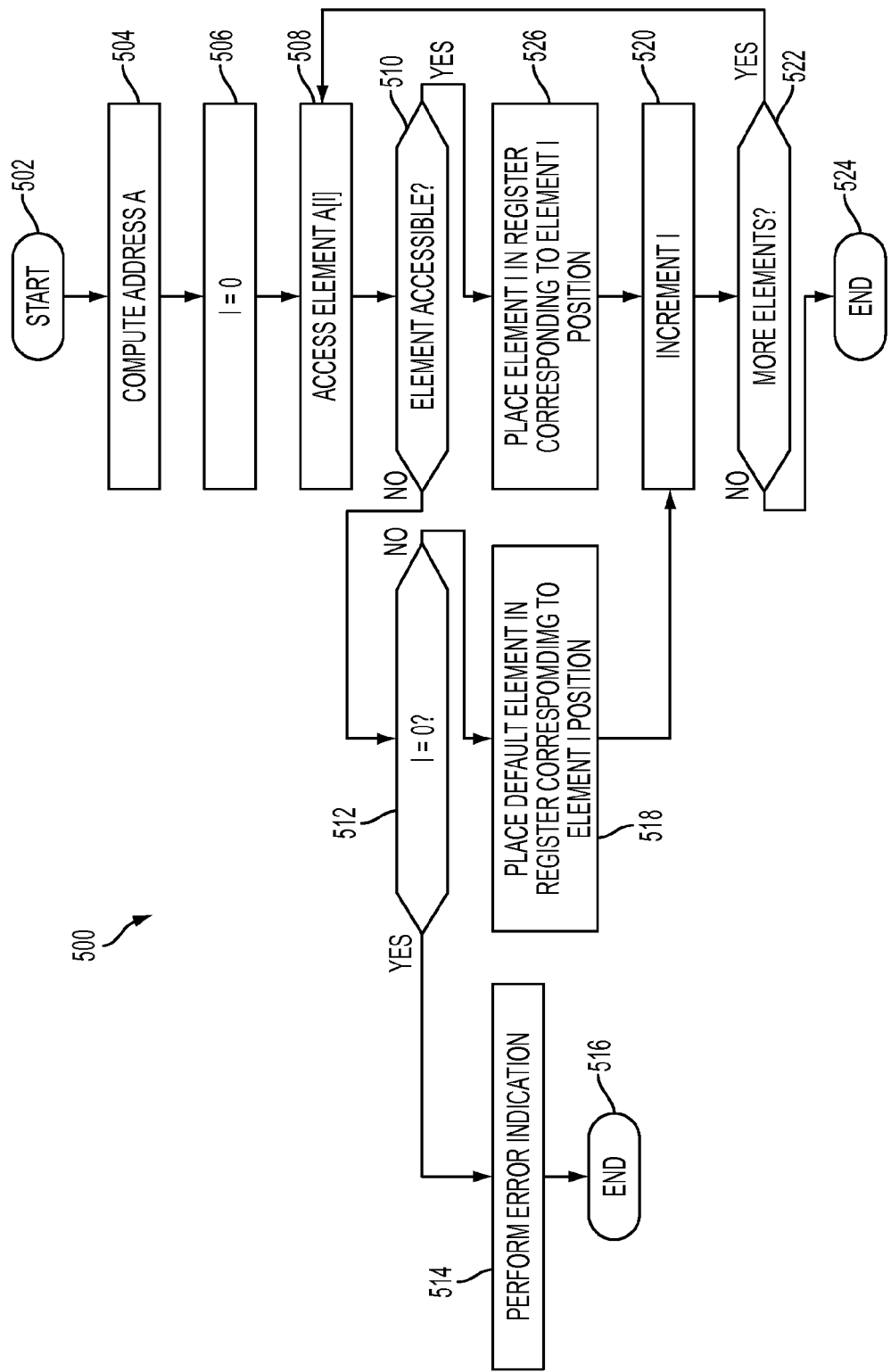
FIG. 5 depicts a flow diagram illustrating a methodology according to one or more embodiments.

FIG. 5 is a flow diagram illustrating a methodology 500 for performing the disclosed auto-termination load instruction methodology in accordance with one or more embodiments of the present disclosure. For ease of illustration and description, methodology 500 is described as a serial operation that processes one character or element at a time. Methodology 500 is equally applicable to a parallel operation wherein blocks of characters or elements are processed at the same time. Methodology 500 begins at block 502 then moves to block 504 to compute the initial address (A) of the load. At block 506, an index pointer (I) is set to zero. In general, I is the index pointer to the particular character (or byte or element) in the source that is to be loaded in the target register. Assuming the target register is loaded from left to right, element zero is the leftmost element. Starting with element zero, block 508 attempts to perform the source storage access pointing to the location at A offset by the index I.

Decision block 510 then determines whether the application has read access to element I, which on the first pass through is element zero. If the answer to the inquiry at decision block 510 is yes, methodology 500 proceeds to block 526 and places element I in the target register corresponding to the element to the I position. Block 520 increments the element pointer. Decision block 522 determines whether there are additional elements. If the answer to the inquiry at decision block 522 is no, methodology 500 proceeds to block 524 and exits the instruction. If the answer to the inquiry at decision block 522 is yes, methodology 500 returns to block 508 to access the next source element in the sequence. If the answer to the inquiry at decision block 510 is no, methodology 500 proceeds to decision block 512 to determine whether methodology 500 is currently looking at the first element. A constraint on methodology 500 is that the application must have access to the first source element. Accordingly, if the answer to the inquiry at decision block 512 is yes, the first source element is not accessible, and methodology 500 proceeds to block 514 and performs an error indication, which is a read access violation. From block 514, methodology 500 exits the instruction at block 516.

If the answer to the inquiry at decision block 512 is no, an element downstream of the first source element is not accessible, and methodology 500 proceeds to block 518 and places a default element in the target register corresponding to the current element I position. Block 520 increments the element pointer. Decision block 522 determines whether there are additional source elements. If the answer to the inquiry at decision block 522 is no, methodology proceeds to block 524 and exits the instruction. If the answer to the inquiry at decision block 522 is yes, methodology 500 returns to block 508 to access the next source element in the sequence.

FIG. 6 depicts a code implementation of a string length (strlen) instruction methodology implemented in accordance with one or more embodiment of the present disclosure, in comparison to additional overhead code (e.g., additional overhead code 104 in FIG. 1) that is needed if, without benefit of the present disclosure, the application is to avoid access violations when using SIMD to access strings that span across memory boundaries. As shown in FIG. 6, an SIMD storage access code 100 includes base storage access code 102 that performs the SIMD load. Additional overhead code 104 takes measures to prevent the above-described page access violations that would occur in an application that attempts an SIMD load of a string that crosses a memory page boundary, wherein the application does not have access privileges to the pages on both sides of the boundary. In comparison, an example of "auto-termination" load storage access code 602 that may be utilized to implement a strlen instruction methodology of the present disclosure is also shown in FIG. 6. As shown in FIG. 6, the embodiments of the present disclosure avoid the need for additional overhead code 104. As previously noted herein, avoiding the need to provide additional overhead code 104 allows the application to realize the reduced processing time that is gained from incorporating SIMD load operations into string processing.

Thus, it can be seen from the forgoing detailed description and accompanying illustrations that technical benefits of the present disclosure include systems and methodologies that permit the speculative loading of data frame elements that extend beyond the end of a string located within the data frame. Abnormal program terminations due to access errors for strings that end close to page boundaries are avoided. String-ending default characters (e.g., terminator characters) are returned for portions of the attempted access that are protected, thereby forcing a conventional termination of null-terminated strings. The application is not made aware of whether the returned default characters reflect initialized space, protected space, or unmapped space. There is no need for software overhead (e.g., additional overhead code 104 shown in FIG. 1) to pre-compute the distance to a page boundary, or for the low-bandwidth, serial storage accesses to carefully approach a page boundary. Thus, the benefits of parallel processing operations, such as SIMD, may be more fully realized. There is also increased opportunity to inline a dynamically linked library (DLL) function call. As an optimization, a compiler can in-line the code for a function call into the main program, thereby eliminating the need to go through the additional overhead of saving return addresses and various registers.

Figure 7:
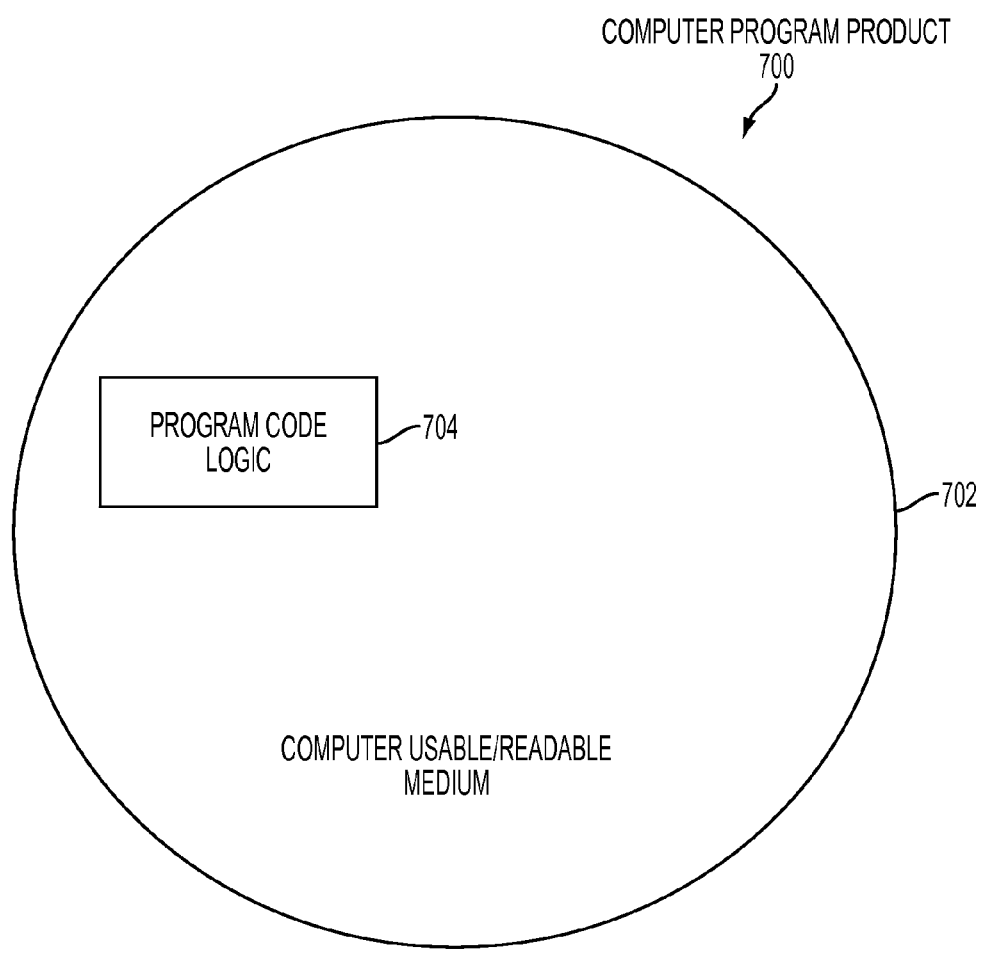
FIG. 7 depicts a computer program product according to one or more embodiments.

Referring now to FIG. 7, a computer program product 700 in accordance with an embodiment that includes a computer readable storage medium 702 and program instructions 704 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer system for accessing a data frame, wherein a first portion of the data frame is in a first memory block, and wherein a second portion of the data frame is in a second memory block, the system comprising:
   a processor configured to initiate an access of the data frame;
   said processor further configured to access the first portion of the data frame; and
   said processor further configured to, based at least in part on a determination that said processor does not have access to the second memory block, access at least one valid default character as a replacement for accessing the second portion of the data frame; and
   said processor further configured to, based at least in par on the determination that said processor does not have access to the second memory block, read the first portion of the data frame, read the at least one valid default character, and load the first portion of the data frame and the at least one valid default character to a target location in order to process the first portion of the data frame and the at least one value default character as a valid data frame.

2. The computer system of claim 1, wherein:
   the data frame comprises a null-terminated string having an indeterminate length;
   said null-terminated string comprises a data portion and at least one terminator character; and
   said at least one terminator character indicates a termination of said null-terminated string.

3. The computer system of claim 1, wherein said processor is further configured to, based at least in part on a determination that said processor has access to the second memory block, access the second portion of the data frame.

4. The computer system of claim 1, wherein
   said target location comprises a target register; and
   said at least one valid default character loaded in said target register represents a termination of a data portion of said data frame.

5. The computer system of claim 4, wherein said processor is further configured to load the first portion of the data frame and load said at least one valid default character as a serial operation.

6. The computer system of claim 4, wherein said processor is further configured to load the first portion of the data frame and load said at least one valid default character as a parallel operation.

7. The computer system of claim 6, wherein said parallel operation comprises a single instruction multiple data (SIMD) operation.

8. The computer system of claim 1, wherein:
   the first memory block comprises a first memory page; and
   the second memory block comprises a second memory page.

9. The computer system of claim 1, wherein said determination that said processor does not have access to the second memory block comprises detecting an access protection violation.

10. The computer system of claim 9, wherein said detecting said access protection violation comprises detecting that a predetermined bit of an interrupt status register has been set.

11. A computer program product for accessing a data frame, wherein a first portion of the data frame is in a first memory block, and wherein a second portion of the data frame is in a second memory block, the computer program product comprising:
   a computer readable storage medium having program instructions embodied therewith, wherein the computer readable storage medium is not a transitory signal per se, the program instructions readable by a processor circuit to cause the processor circuit to perform a method comprising:
   initiating an access of the data frame;
   accessing the first portion of the data frame;
   based at least in part on a determination that the program instructions do not have access to the second memory block, accessing at least one valid default character as a replacement for accessing the second portion of the data frame; and
   based at least in part on the determination that the program instructions do not have access to the second memory block, reading the first portion of the data frame, reading the at least one valid default character, and loading the first portion of the data frame and the at least one valid default character to a target location in order to process the first portion of the data frame and the at least one valid default character as a valid data frame.

12. The computer program product of claim 11, wherein:
   the data frame comprises a null-terminated string having an indeterminate length;
   said null-terminated string comprises a data portion and at least one terminator character; and
   said at least one terminator character indicates a termination of said null-terminated string.

13. The computer program product of claim 11 further comprising:
   based at least in part on a determination that the program instructions have access to the second memory block, accessing the second portion of the data frame.

14. The computer program product of claim 11, wherein:
   a target register; and
   said at least one valid default character loaded in said target register represents a termination of a data portion of said data frame.

15. The computer program product of claim 11, wherein:
   said determination that the program instructions do not have access to the second memory block comprises detecting an access protection violation; and
   said detecting said access protection violation comprises detecting that a predetermined bit of an interrupt status register has been set.

* * * * *